United States Patent
Leahy et al.

(10) Patent No.: US 7,271,201 B1
(45) Date of Patent: Sep. 18, 2007

(54) USE OF WASTE HEAT FROM FISCHER-TROPSCH SYNTHESIS TO FORM DRY PULVERIZED FUEL FEEDSTOCK

(75) Inventors: James Francis Leahy, Tulsa, OK (US); Robert L. Freerks, Jenks, OK (US)

(73) Assignee: Syntroleum Corporation, Houston, TX (US)

(*) Notice: Subject to any disclaimer, the term of this patent is extended or adjusted under 35 U.S.C. 154(b) by 0 days.

(21) Appl. No.: 11/499,938

(22) Filed: Aug. 7, 2006

(51) Int. Cl.
*C07C 27/00* (2006.01)
*C10L 5/00* (2006.01)
*C01B 3/24* (2006.01)
*B01J 8/00* (2006.01)
*F23G 5/04* (2006.01)
*F23G 5/12* (2006.01)
*F23K 1/00* (2006.01)

(52) U.S. Cl. ............... 518/728; 44/626; 48/127.1; 48/127.9; 110/224; 110/229; 110/232

(58) Field of Classification Search ............... 518/728; 44/626, 629; 48/127.1, 127.9; 110/224, 110/229, 232
See application file for complete search history.

(56) References Cited

U.S. PATENT DOCUMENTS

| | | |
|---|---|---|
| 4,016,102 A | 4/1977 | Marion |
| 4,097,361 A | 6/1978 | Ashworth |
| 5,200,063 A | 4/1993 | Neskora |
| 5,543,437 A | 8/1996 | Benham |
| 5,922,090 A | 7/1999 | Fujimura |
| 6,664,302 B2 | 12/2003 | French et al. |
| 6,855,737 B2 | 2/2005 | Newton |
| 6,903,140 B2 | 6/2005 | Font Freide et al. |
| 7,001,927 B2 | 2/2006 | Zhang et al. |
| RE39,073 E | 4/2006 | Herbolzheimer et al. |
| 7,022,742 B2 | 4/2006 | Inga |
| 2006/0075682 A1* | 4/2006 | Bullinger et al. ............ 44/626 |

OTHER PUBLICATIONS

"The Energy Blog: Tehnical NOte: Fischer-Tropsch Process," Apr. 5, 2005.

* cited by examiner

*Primary Examiner*—J. Parsa
(74) *Attorney, Agent, or Firm*—Buskop Law Group, PC; Wendy Buskop

(57) ABSTRACT

A method and a system for drying a biomass, wet pulverized coal or combinations thereof, using heat from a Fischer-Tropsch synthesis in a heat exchanger to heat a nitrogen gas, using a flue gas in a heater to heat the heated nitrogen gas to a higher temperature, passing the twice heated nitrogen gas through apparatus to pulverize the fuel source of coal, biomass or both, forming a gas/particulate stream, filtering the gas/particulate stream in a filter to remove dried fuel feed stocks and using a blower to form a first steam and nitrogen mixture for discharge, and a second steam and nitrogen mixture for mixing with additional dry nitrogen gas for introduction to the first step of the method, at the heat exchanger.

20 Claims, 2 Drawing Sheets

USE OF WASTE HEAT FROM FISCHER-TROPSCH SYNTHESIS TO FORM DRY PULVERIZED FUEL FEEDSTOCK

FIELD OF INVENTION

The present embodiments generally relate to methods and systems for removing water from coal to form a usable dry feedstock, or removing water from biomass creating a usable dry feedstock, or removing water from combinations of coal and biomass forming a usable dried fuel feedstock. The fuel feed stocks are formed using heat from of a Fischer-Tropsch reaction synthesis of high molecular weight hydrocarbon mixtures.

BACKGROUND

Refineries and plants that perform Fischer-Tropsch reactions find that the processes can produce a large amount of heat, which is typically released to the environment as waste heat without recycling.

A need exists to use waste heat from synthesis reactions, to heat materials in another process, creating a more environmentally friendly method and system that substantially reduce release of waste heat to the environment, thus protecting the environment and taking a step to reduce global warming.

A need also exists to reduce demands for oil by offering a low cost alternative to the use of oil to create electricity or use in gasification equipment, by enabling the use of cheaper coal stocks or wet biomass and creating dried fuel feedstock that can be used in electrical generating plants, refineries and chemical plants.

A need exists to use biomass as a fuel for gasification processes to reduce new carbon dioxide emissions to the environment, and thereby reduce global warming.

A need exists for a low cost, or environmentally friendly fuel feedstock creation method for use in gasification plants.

The present embodiments meet these needs.

SUMMARY

The embodiments generally relate to a method for preparing fuel feed stocks from wet pulverized coal, or biomass or combinations of wet coal and biomass by using heat from a Fischer Tropsch synthesis process.

The method uses steam heat from a Fischer-Tropsch process in a heat exchanger to raise the temperature of either an initial nitrogen gas stream or a recycled nitrogen/steam stream to raise the temperature of the stream to a first temperature between about 212 degrees Fahrenheit and about 350 degrees Fahrenheit forming a heated nitrogen gas.

The heated nitrogen gas is further heated to a temperature of about 572 degrees Fahrenheit by mixing the heated nitrogen gas with a flue gas, such a flue gas formed in a heater, like a firebox or incinerator.

The twice heated nitrogen gas is then passed through a pulverized fuel source, such as pulverized wet coal or pulverized biomass or combinations of these, raising the temperature of the pulverized fuel source to a temperature between about 180 degrees Fahrenheit to about 220 degrees Fahrenheit forming a gas/particulate stream of heated nitrogen gas, steam and a pulverized fuel dust having a ratio of between 40:1 to 150:1 in cubic feet of gas per pound of pulverized fuel dust. The pulverized fuel source is held resident in an apparatus for forming pulverized fuel source, which is either a crusher classifier, for the coal, or a pulverizer, in the case of the biomass material.

The gas/particulate stream is filtered forming a stream of steam and nitrogen gas mixture and dried fuel feedstock using a filter, typically a bag filter. The dried fuel feed stocks are then removed from the filter for use in a gasification plant, or other fuel burning facility.

A vacuum is applied to the stream of steam and nitrogen mixture to remove a first portion of the stream for discharge to a vessel, or to atmosphere, and a second portion of the stream for mixing with additional nitrogen and then being introduced to the heat exchanger repeat of the process using the steam and nitrogen mixture.

BRIEF DESCRIPTION OF THE DRAWINGS

The detailed description will be better understood in conjunction with the accompanying drawings as follows.

Figure 1:
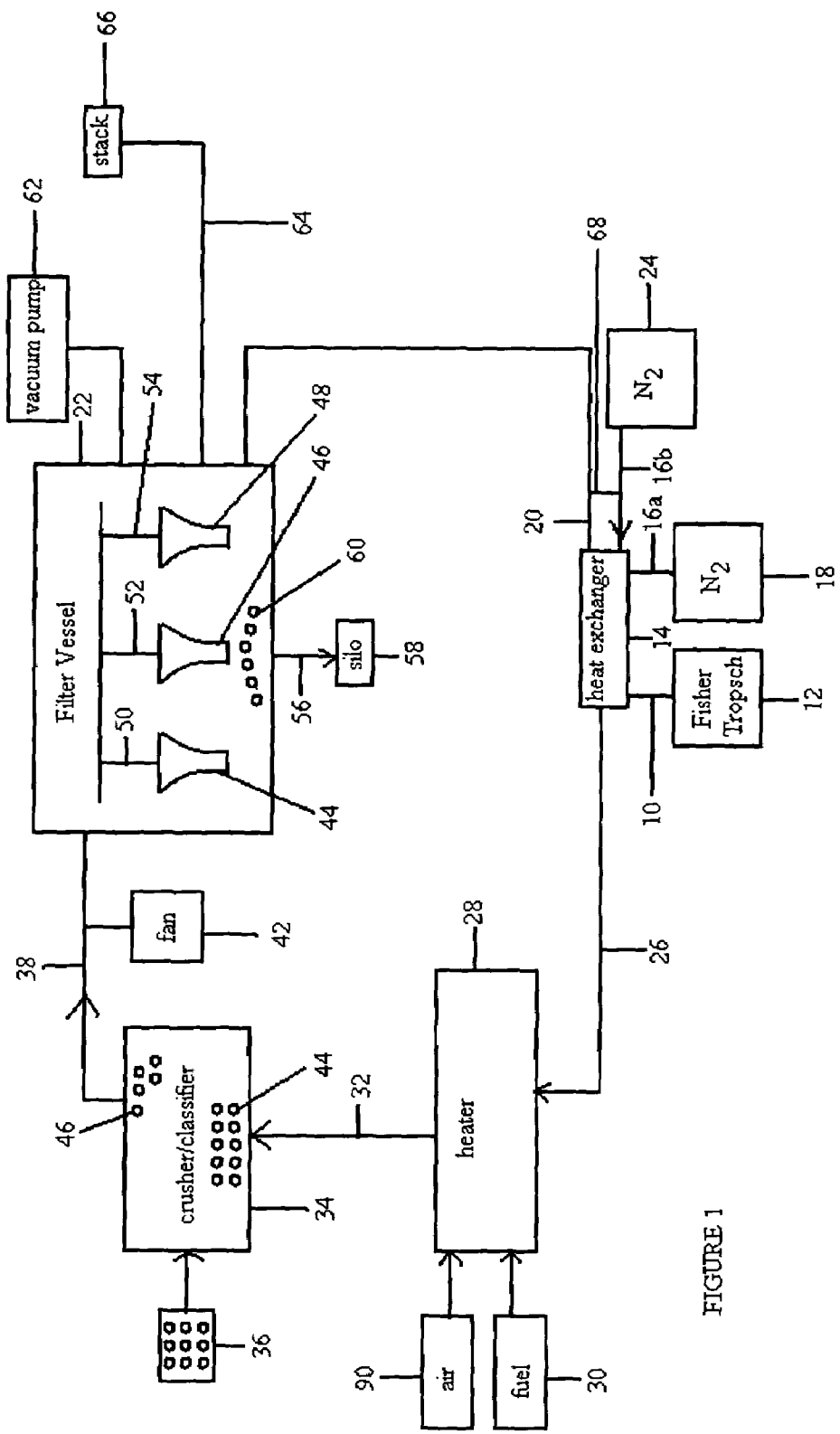
FIG. 1 depicts a schematic of a pulverized fuel treatment system operated in conjunction with a Fischer-Tropsch reactor.

The embodiments are detailed below with reference to the listed Figures.

DETAILED DESCRIPTION

Before explaining the embodiments in detail, it is to be understood that the embodiments are not limited to the particular embodiments and that the embodiments can be practiced or carried out in various ways.

A benefit of the embodiments is that it can help a facility improve its greenhouse gas emission accountability by converting biomass to a usable fuel feedstock, a "biofeed", or creating a feedstock from a combination of wet coal and biomass. Biofeeds are considered greenhouse gas neutral in a lifetime assessment of a facility, such as a gasification facility and have the advantage of not increasing facilities accountability for new carbon dioxide emissions that lead to global warming.

The embodiments use biomass which traditionally has been wet agricultural wastes, such as chips, grasses, and corn waste. The agricultural wastes have been traditionally unusable as a fuel unless they are dried, which either takes a long time in the suns or requires electric run blowers or other equipment that obtains its energy from fossil fuels to dry the agricultural material, making its use extremely expensive.

The embodiments help to reduce carbon dioxide emissions and greenhouse emission debits of a facility by using a carbon dioxide neutral starting material, a biomass or a combination of biomass with coal.

The embodiments additionally help reduce global warming by using waste heat from Fischer Tropsch reactions and reusing the waste heat in a unique and surprising manner to create more fuel feed stocks for gasification units and other plants.

The embodiments permit the use of biomass to create a fuel by reducing the amount of greenhouse gas emission assigned to a facility because the facility will not use a new source of carbon in the process.

The present embodiments generally relate to systems and methods for preparing fuel feed stocks from coal, biomass, or combinations thereof by removing water from the fuel source. The fuel source is wet coal, biomass or combinations of wet coal with biomass. The fuel source is thereof using an exchange of heat using steam from a Fischer-Tropsch reaction of high molecular weight hydrocarbon mixtures.

The preparation of hydrocarbons from synthesis gas is well known in the art and can be referred to a Fischer-Tropsch synthesis, the Fischer-Tropsch process, or Fischer-Tropsch reactions(s). Fischer-Tropsch synthesis generally entails contacting a stream of synthesis gas with a heterogeneous catalyst under elevated temperatures and pressures that allow synthesis gas to react and form hydrocarbon mixtures.

In particular, the Fischer-Tropsch reaction is the catalytic hydrogenation of carbon monoxide to produce any of a variety of products ranging from methane to higher alkenes and aliphatic alcohols. Each of these Fischer-Tropsch reactors can produce large quantities and qualities of heat. This heat has traditionally been allowed to simply dissipate into the atmosphere around the reactors and can heat the chemical plant or refinery where the reaction is occurring, causing temperature changes.

The embodiments capture waste heat and reuses the waste heat to reduce the cost of performing the Fischer-Tropsch process, or operating a gasification facility. Further, the invention by reusing of the waste heat should lead to reductions in fossil fuel costs.

Additional embodiments provide systems and methods for recycling the heat from the Fischer-Tropsch reaction to dehydrate coal feed stocks, or biomass which can lower the cost to manufacture enabling an owner to use cheaper coal instead of oil, and biomass instead of oil which is more environmentally friendly.

Additional embodiments provide a way to reduce the dependence on the use of fossil fuels, and conserve oil by enabling an owner to use less oil by reusing the heat of the Fischer-Tropsch reactor, remove water from coal to create a usable coal feed stocks for gasification plants.

The embodiments of the systems and methods include taking the heat from the Fischer Tropsch reactor in a continuous system.

Water is undesirable in coal gasification feedstocks as wet coal will not produce as high gasification temperatures and carbon monoxide yields as dry coal. Water is undesirable in biomass, as the agricultural material simply will not burn.

Water reduced coal or water reduced biomass or combinations of these are desirable, even if 6 wt % to 12 wt % water remains in the coal or biomass.

The embodiments enable the water content of coal to drop to less than about 10% and as low as about 8%, by removing least 5 wt % and up to 35 wt % of the water from the coal. The weight percent (wt %) of the water is defined as the amount of water per unit mass of a coal feedstock quantity.

A number of different water removal means and methods can be employed to remove water from the coal feedstock using the heat from the Fischer-Tropsch reactor. While some methods can be independent of the reactor, such as on the outside of the reactor, others may utilize an internal arrangement within the Fischer-Tropsch rector to produce the steam ultimately used for drying a fuel source.

The different water removal means can be combined with each other in various arrangements to increase the efficiency of overall water removal process using the heat from the Fisher-Tropsch reactor.

With reference to the figures, FIG. 1 depicts a schematic of a coal feedstock pretreatment system operated in conjunction with a Fischer-Tropsch reactor for preparing coal feed stocks. The same system can be used for biomass. However, the coal crusher classifier would be replaced with a pulverizer for mashing, shredding, and cutting the biomass grasses, wood ships or other matter. The device, the coal crusher classifier and the pulverizer will be generally referred to herein as "apparatus for pulverizing a fuel source."

Returning to FIG. 1, steam (10) from a Fischer Tropsch reactor (12), is passed to a heat exchanger (14). A usable heat exchanger can be a shell and tube heat exchanger or a welded plate and frame heat exchanger, such as those made by Tranter, Incorporated of Wichita Falls, Tex.

The heat exchanger (14) additionally receives initial nitrogen gas (16a), from an initial nitrogen source (18). After start up, in an embodiment, it is contemplated that the initial nitrogen gas can be replaced by a steam and nitrogen mixture (20) created by the system.

In an alternative embodiment, the heat exchanger (14) can receive a mix of initial nitrogen gas (16a) from an additional nitrogen source (24) with the steam and nitrogen mixture (20) which is a portion of gas from a filter (22) used in the process.

The initial nitrogen gas can be either generally pure or 100% dry nitrogen gas or a dry mixture of nitrogen with about 4 w % to about 8% oxygen gas based on the total content of the mixture.

The heat exchanger (14) uses the steam from the Fischer-Tropsch reactor (12) to heat the initial nitrogen gas to a temperature between about 212 degrees Fahrenheit to about 350 degrees Fahrenheit.

When heating occurs after startup, the heat exchanger (14) uses the steam from the Fisher-Tropsch reactor (12) to heat the mix of steam and nitrogen (20) with additional nitrogen (16a and 16b, or combinations thereof) forming heated nitrogen gas (26).

The heated nitrogen gas (26) is received by a heater (28), which can be a firebox or an incinerator. The heated nitrogen gas can be increased in temperature solely by the heater or, in another embodiment, it can be heated by combusting fuel (30) and air (90) in the heater forming a flue gas and then mixing the heated nitrogen gas with the flue gas. It can be noted that a usable heater is a firebox made by Mac, Incorporated of Glenburn, Ohio.

The combustion of fuel and air creating a flue gas raises the temperature of the heated nitrogen gas in the heater to a temperature of at least 572 degrees Fahrenheit forming a twice heated nitrogen gas (32). Regardless if the nitrogen is simply heated in the heater or heated using flue gases, the twice heated nitrogen (32) is then passed to an apparatus for pulverizing the fuel source, in the FIG. 1, shown as a coal crusher classifier (34).

The coal crusher classifier (34) is a device that receives lumps of coal (36) which typically contain some water on the coal and pulverizes the lumps into a wet coal dust. A usable crusher classifier would be a MPS Vertical mill made by Gebrudder Pfeiffer AG (Gebr. Pfeiffer AG) of Germany. Vertical roller mills for coal with classifiers made by Alstrom of France are usable herein. It is contemplated that any type of crusher or milling device with a classifier for coal would work herein.

The crusher classifier (34) receives the twice heated nitrogen (32) and passes the twice heated nitrogen through the pulverized and classified wet coal. This activity creates steam and forms a mixture of steam and pulverized fuel source, in this embodiment, ground coal dust (38) as the twice heated nitrogen gas causes water resident on the coal to vaporize into steam.

The heater (28) in an embodiment can be a fired heater without tubes. The heater is maintained in fluid communication with the crusher classifier (34) using tubing that is also in communication with a fan or blower (42) which draws the twice heated nitrogen (32) from the heater through the crusher classifier using the buoyancy of hot gasses to convey the fine coal dust and permit crushed larger particles (44) of coal (36) to gather in the base of the crusher classifier (34). As the fine coal dust (46) is conveyed up from the crusher classifier (34), larger particles (44) fall back to be crushed again in the crusher classifier.

In an embodiment, the heated nitrogen gas and ground coal dust mixture (38) wherein the mixture has a ratio of gas to coal dust between 40:1 and 150:1 in cubic feet of gas per pound of ground coal dust.

This process enables wet coal dust to be used to create dried coal fuel feed stocks, which are generally cheaper in cost for production of energy. The process enables the wet coal dust to generate steam, and then the steam is reused to dry more coal in a cyclical process that constantly repeats. In this way, wet coal, having a lower British thermal unit (Btu) can be made into a higher Btu material at a lower cost, which is a significant environmental advantage, which saves and conserves fossil fuels.

The heated nitrogen gas and ground coal dust mixture (38) can be passed to a filter (22) such as a vessel containing bag filters as shown in this embodiment. Bag filters (44, 46, and 48), are shown along with a flow insertion wands (50, 52, and 54) for pulsing each bag filters enabling the dried fuel feedstock to fall to the bottom of the vessel.

An exemplary bag filter is one made by U.S. Air Filtration, Incorporated of Temecula, Calif. A usable filter (22) can hold between about 50 filtering bags to about 500 filtering bags, though only 3 filter bags are shown in FIG. 1.

In the filter (22), fewer bag filters can be used for smaller flow rate gasses with lower velocities, more bag filters would be needed for higher velocities. Additional embodiments can have a filter having about 100 filtering bags.

Dried pulverized coal feedstock (56) is removed from the filter (22) using gravity and collected in a silo (58). Other types of containers can also be used to collect the dried pulverized coal feedstock.

The filter (22) can use bag filters with a pore size between about 5 microns to about 50 microns, such as those made by Gore Tex Company of Newark, Del. The bag filters enable gas containing the coal dust, steam and nitrogen to flow into the bags and out of the filter as clean nitrogen and steam without particles, and dried fuel feedstock collects on the outside of the bag filters. The flow insertion wands pulse the bag filters periodically causing dried coal dust (60) on the exterior of the bag filters to fall to the bottom of the filter (22) for removal. It is contemplated that each bag filter can hold about 10 liters to about 50 liters of gas, and each filter bag can have a look and a shape of a wind sock. The filter (22) can have a filter housing made of metal, to prevent deformation in the presence of hot steam and hot gasses. The bag filter housing can be made of steel, a stainless steel, or another metal alloy that can withstand impact of the coal dust and steam without degrading.

A vacuum pump (62) can be used to apply a vacuum to the filter (22) such as 0.1 bars to help in the evacuation of the steam and nitrogen mixture from the filter.

The steam and nitrogen mixture can be separated into two streams, a first stream comprising steam and nitrogen for discharge to the atmosphere (64) via a stack (66), and a second stream of steam and nitrogen (20) for recycling back to the heat exchanger.

The second stream of the steam and nitrogen mixture (20) can be mixed with additional dry nitrogen gas (24) at the heat exchanger, or premixed in a vessel or tubing (68) forming a mixture of hot wet nitrogen with additional dry nitrogen gas (50), for flowing into the heat exchanger (14) to repeat the process.

The flow rate for the entire system is contemplated to be between about 80,000 cubic feet to about 300,000 cubic feet of gas mixture per ton of coal.

Alternative embodiments of the system contemplate using a blower instead of a vacuum pump that can be a centrifugal blower or a squirrel caged blower adapted to provide between about 0.005 bars of vacuum to about 0.100 bar of vacuum on the filter (22). These types of blowers are available from Gardner Denver of Quincy, Ill.

Figure 2:
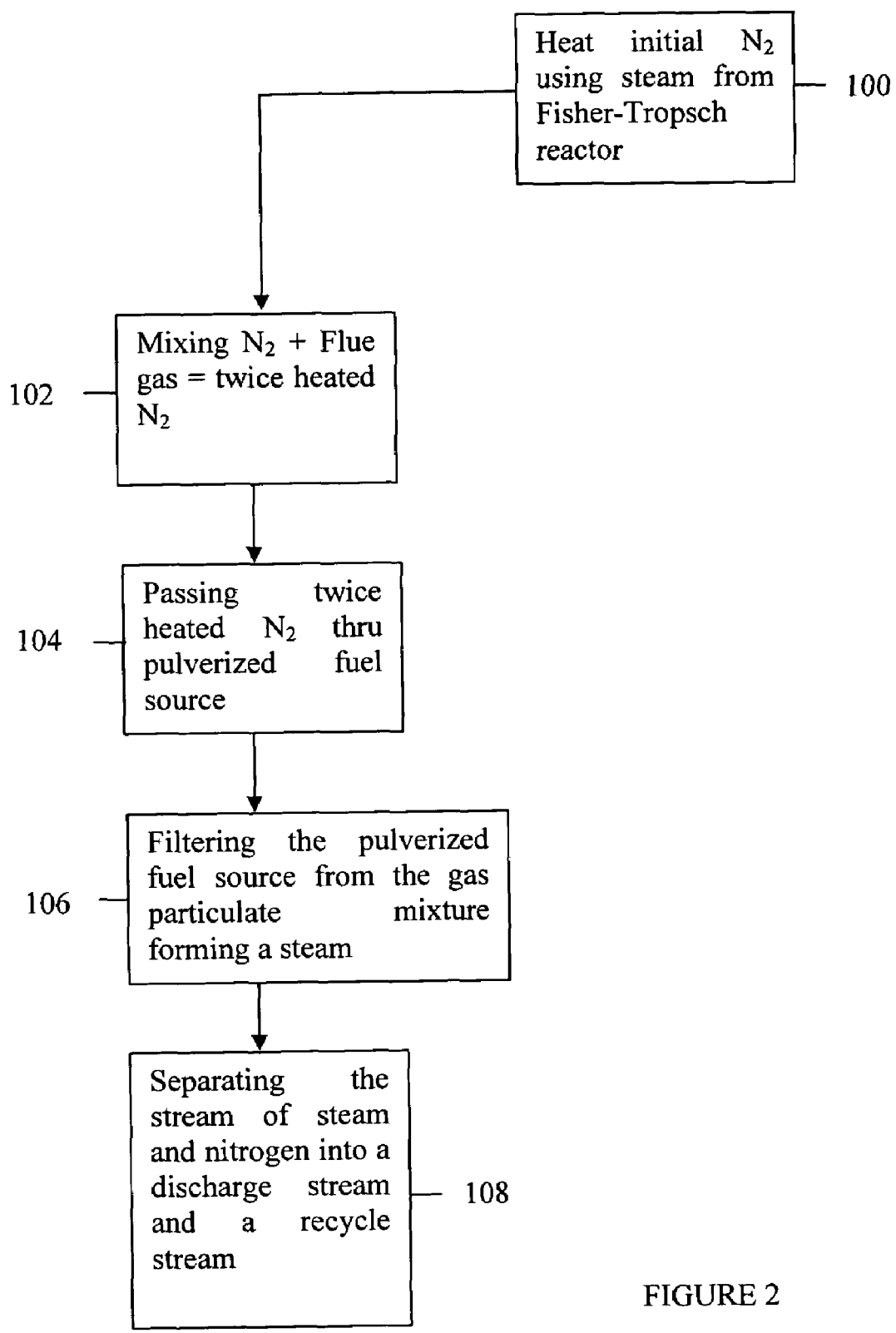
FIG. 2 depicts an embodiment of a method for preparing dried fuel feed stocks using heat from a Fischer-Tropsch reactor.

FIG. 2 depicts a method for preparing dried fuel feed stocks made from wet coal, biomass, or combinations of wet coal and biomass, using heat from a Fischer-Tropsch reactor. The method or process is cyclic, and repeating in a continuous fashion.

Step 100 shows that heat can be generated from steam produced by a Fischer-Tropsch synthesis of high molecular weight hydrocarbons is exchanged in a heat exchanger to raise the temperature of an initial nitrogen gas to the temperature between about 212 degrees Fahrenheit to about 350 degrees Fahrenheit forming a heated nitrogen gas.

Step 102 depicts the step of mixing the heated nitrogen gas with a flue gas to form a twice heated nitrogen mixture at a temperature of at least 572 degrees Fahrenheit, wherein the flue gas is formed in a heater by combustion of a fuel in air.

Step 104 involves passing the twice heated nitrogen mixture through a pulverized fuel source to raise the temperature of the pulverized fuel source to a temperature between about 180 degrees Fahrenheit and about 220 degrees Fahrenheit, and form a gas/particulate mixture of nitrogen, steam, and pulverized fuel source.

In an embodiment, the gas/particulate mixture has a ratio of gas to particulate between 40:1 and 150:1 in cubic feet of gas per pound of pulverized fuel source Step 106 portrays the step of filtering the pulverized fuel source from the gas/particulate mixture forming a stream of steam and nitrogen and a dried fuel feedstock.

Step 108 involves separating the stream of steam and nitrogen into a discharge stream and a recycle stream, wherein the recycle stream mixes with additional nitrogen for use in as the nitrogen gas, and then the steps are repeated as shown.

The method contemplates using a pulverized fuel source that has between about 8 wt % to about 10 wt % absorbed water. The pulverized fuel source can be combinations of wet pulverized coal and pulverized biomass that has up to about 20% of pulverized biomass, and in another embodiment, between about 3% to about 10% biomass. In an embodiment, the pulverized fuel source has about 95% particulate smaller than about 400 microns in diameter and about 50% particulate smaller than about 200 microns in diameter.

The pulverized biomass can be wood chips, switch grass, corn stover or corn stalks, bagass from sugar cane, another leafy plant matter, or combinations of these items.

In an embodiment, the filtering of the dried fuel feedstock occurs in a filter using multiple bag filters and at least one flow insertion wand for periodically pulsing each bag filter to remove the dried fuel feedstock.

In another embodiment, the twice heated nitrogen gas is passed through the pulverized fuel source at a flow rate between about 80,000 cubic feet to about 300,000 cubic feet per ton of pulverized fuel source. It is also contemplated that the pulverized fuel source can be placed under a slight vacuum during heating.

It is also contemplated that the dried fuel feedstock is removed from the filter using gravity during filtration in one embodiment . . .

An embodiment will now be described with reference to the following example,

EXAMPLE 1

A slurry bubble column Fischer-Tropsch reactor having a mixture of cobalt catalyst and wax receives synthesis gas and exothermically provides heat. Water is boiled in coils in this column forming steam.

Steam from the Fischer-Tropsch reactor is transferred to a shell and tube heat exchanger, such as one made by Cust-O-Fab of Sand Springs, Okla.

Nitrogen gas and a recycled steam and nitrogen mixture are injected into the shell and tube heat exchanger and heated by the steam of the Fischer-Tropsch reactor without mixing with the steam.

The heated mixture of nitrogen gas and the recycled steam and nitrogen mixture is then mixed with a flue gas produced from a firebox, which further raises the temperature of the combined mixture of the nitrogen gas and recycled steam and nitrogen to about 572 degrees Fahrenheit, which forms a hot gas mixture.

This twice heated hot nitrogen, at a temperature of approximately 572 degrees Fahrenheit, is passed to a coal crusher/classifier.

The hot gas mixture blows through the crushed coal, upwards against gravity, entraining fine coal dust. The blowing gas permits permitting larger coal particles to fall to the bottom of the crusher/classifier to be crushed into finer and smaller sizes. The process is continued until only fine coal dust is formed in the crusher/classifier. Then, the hot gas carries the dust and gas together as a mixture out of the crusher/classifier to a filter.

The combination of the fine coal dust and heated nitrogen gas is termed here the "heated gas/particulate mixture", which includes steam, as water is released from the larger particulates and fine coal dust by the hot nitrogen gas. The hot nitrogen gas passes over and through the particles and fine coal dust drying the coal.

The heated gas, particulate, and steam mixture can be injected into the bag filter housing slowly and at a slight vacuum through the bag filter. The residence time for the dust on the filters within the bag filter housing can be only about 30 seconds, and the nitrogen passes through the filter bags with the steam. The bag filters in the vessel are pulsed to shake off the dust for about 1 second of every 30 seconds using at least one flow insertion wand for periodically pulsing each bag filter within the vessel.

The gas and steam mixture is removed from the bag filter housing a gas blower which applies a small vacuum of about 0.1 bar of vacuum to the filter. The gas blower acts like a vacuum to suction the gas. The blower increases the pressure of the nitrogen gas and steam mixture permitting reuse of at least a portion of the gas and steam mixture and discharging of a portion.

The portion of the nitrogen gas and steam mixture to be reused is directed to the shell and tube heat exchanger where it mixes with additional dry nitrogen gas to form, in the shell heat exchanger, a gas and steam heated mixture.

Dried pulverized coal can be continuously removed from the bottom of the bag filter housing, wherein the dried pulverized coal has a water content of about 6 wt % to about 10 wt % of water.

This example enables fine coal feedstocks to be dried in a continuous manner and enables waste heat to be recycled and reused from the Fischer-Tropsch reactions, saving on the cost of gas and electricity, and conserving the use of fossil fuels for these reactions.

While these embodiments have been described with emphasis on the preferred embodiments, it should be understood that within the scope of the appended claims, the embodiments might be practiced other than as specifically described herein.

What is claimed is:

1. A method for using heat of a Fischer-Tropsch synthesis reactor to create dry fuel feedstocks, wherein the method comprises:
   a. exchanging heat from steam produced by a Fischer-Tropsch synthesis of high molecular weight hydrocarbons to raise a temperature of an initial nitrogen gas to the temperature between about 212 degrees Fahrenheit to about 350 degrees Fahrenheit forming a heated nitrogen gas;
   b. mixing the heated nitrogen gas with a flue gas to form a twice heated nitrogen mixture at a temperature of at least 572 degrees Fahrenheit, wherein the flue gas is formed in a heater by combustion of a fuel in air;
   c. passing the twice heated nitrogen mixture through a pulverized fuel source to raise the temperature of the pulverized fuel source to a temperature between about 180 degrees Fahrenheit and about 220 degrees Fahrenheit, and form a gas/particulate mixture of nitrogen, steam, and pulverized fuel source, wherein the gas/particulate mixture has a ratio of gas to particulate between 40:1 and 150:1 in cubic feet of gas per pound of pulverized fuel source;
   d. filtering the pulverized fuel source from the gas/particulate mixture forming a stream of steam and nitrogen and a dried fuel feedstock; and
   e. separating the stream of steam and nitrogen into a discharge stream and a recycle stream, wherein the recycle stream mixes with additional nitrogen for use in as the nitrogen gas for repeating the method.

2. The method of claim 1, wherein the pulverized fuel source has between about 8 wt % to about 10 wt % absorbed water.

3. The method of claim 1, wherein the pulverized fuel source is a wet pulverized coal, a pulverized biomass, or combinations thereof.

4. The method of claim 3, wherein the combinations of wet pulverized coal and pulverized biomass comprise up to about 20% of pulverized biomass.

5. The method of claim 3, wherein the pulverized biomass comprises a member of the group: wood chips, switch grass, corn stover, bagass, other leafy plant matter, or combinations thereof.

6. The method of claim 1, wherein the filtering of the dried fuel feedstock occurs in a filter using multiple bag filters and at least one flow insertion wand for periodically pulsing each bag filter to remove the dried fuel feedstock.

7. The method of claim 1, wherein the twice heated nitrogen gas is passed through the pulverized fuel source at a flow rate between about 80,000 cubic feet to about 300,000 cubic feet per ton of pulverized fuel source.

8. The method of claim 1, wherein the pulverized fuel source has about 95% particulate smaller than about 400 microns in diameter and about 50% particulate smaller than about 200 microns in diameter.

9. The method of claim 1, further comprising the step of placing the pulverized fuel source under a slight vacuum during heating.

10. The method of claim 1, further comprising using gravity to remove the dried fuel feedstock during filtration.

11. A system for using heat of a Fischer-Tropsch synthesis reactor to dry wet pulverized coal, pulverized biomass, or combinations thereof, comprising:
   a. a heat exchanger for receiving an initial nitrogen gas from a nitrogen source, steam from a Fischer-Tropsch reactor, and heating the initial nitrogen gas to a temperature between about 212 degrees Fahrenheit and about 350 degrees Fahrenheit forming a heated nitrogen gas;
   b. a heater for receiving the heated nitrogen gas, mixing the heated nitrogen gas with a flue gas and raising the temperature of the heated nitrogen gas to at least 572 degrees Fahrenheit forming a twice heated nitrogen gas;
   c. an apparatus for forming a pulverized fuel source selected from the group: a crusher/classifier for receiving, crushing, and classifying coal; and a biomass pulverizer for receiving, and forming biomass particles, and wherein the apparatus for forming a pulverized fuel source receives the twice heated nitrogen gas while creating the pulverized fuel source forming a gas/particulate mixture of nitrogen, steam and pulverized fuel source in a ratio between 40:1 and 150:1 in cubic feet of gas per pound of pulverized fuel source;
   d. a filter for receiving the gas/particulate mixture from the apparatus for forming a pulverized fuel source, filtering a steam and nitrogen mixture from the particulate forming a dried fuel feedstock; and
   e. a blower for applying a vacuum to the filter for removal of a first portion of the steam and nitrogen mixture for discharge and a second portion of the steam and nitrogen mixture for mixing with an additional dry nitrogen gas prior to recycling to the heat exchanger.

12. The system of claim 11, wherein the heat exchanger is a shell and tube heat exchanger.

13. The system of claim 11, wherein the filter comprises a plurality of bag filters and at least one flow insertion wand for pulsing the filter bags at periodic intervals.

14. The system of claim 11, wherein the heater is an incinerator or a firebox.

15. The system of claim 11, wherein the blower is a centrifugal blower or a squirrel caged blower adapted to provide between about 0.005 to about 0.100 bar of vacuum on the filter.

16. The system of claim 11, further comprising a fan facilitating the flow of air from the apparatus for forming a pulverizing fuel source.

17. The system of claim 11, further comprising a silo for receiving the dried fuel feedstock from the filter.

18. The system of claim 11, further comprising tubes for mixing the second portion of the steam and nitrogen mixture with additional nitrogen prior to introduction of the steam and nitrogen mixture to the heat exchanger.

19. The system of claim 11, wherein the additional nitrogen and the initial nitrogen are supplied from a single source.

20. The system of claim 1, wherein the heater combusts a fuel to form the flue gas for heating the nitrogen gas.

* * * * *